United States Patent

[11] 3,568,807

[72] Inventor Anthony W. Harrison
 Kings Road, Tyseley, Birmingham, England
[21] Appl. No. 805,477
[22] Filed Mar. 10, 1969
[45] Patented Mar. 9, 1971
[32] Priority Mar. 19, 1968
[33] Great Britain
[31] 13337/68

[54] VEHICLE DISC BRAKES
 4 Claims, 11 Drawing Figs.
[52] U.S. Cl. ................................................ 188/73.6
[51] Int. Cl. .......................................... F16d 65/02
[50] Field of Search ............................... 188/73, 73 (CL), 205.3

[56] References Cited
UNITED STATES PATENTS

| | | | |
|---|---|---|---|
| 3,110,365 | 11/1963 | Butter | 188/73 |
| 3,256,959 | 6/1966 | Eggstein | 188/73 |
| 3,261,430 | 7/1966 | Wilson et al. | 188/73 |
| 3,357,523 | 12/1967 | Reed et al. | 188/73 |

Primary Examiner—George E. A. Halvosa
Attorney—Scrivener, Parker, Scrivener and Clarke ABSTRACT: A caliper-type disc brake having renewable brake pad assemblies which are accommodated in opposed recesses formed in the caliper body on opposite sides of the gap in the body which receives the brake disc, the recesses and pad assemblies being complementarily shaped, so that the pad assemblies are guided for movement towards and away from one another and are restrained against any substantial movement in planes parallel to that of the brake disc; to allow the insertion, without the need to dismantle the caliper body, of pad assemblies having a thickness greater than the width of the gap in the caliper body, at least one of the pad assemblies and the corresponding recess are so shaped that the pad assembly can be inserted into the recess by movement in a plane parallel to that of the brake disc of said one pad assembly relative to the caliper structure, and one of said relatively movable members carries a spring clip while the other is provided with a cooperating shoulder with which the spring clip makes positive locking engagement when the pad assembly is in operative position, the spring clip yielding resiliently to permit such insertion.

VEHICLE DISC BRAKES

This invention relates to vehicle disc brakes of the general form comprising a caliper structure formed with a gap for receiving a peripheral portion of the brake disc and a pair of pad assemblies, actuated by respective pistons and accommodated in opposed recesses formed in the caliper structure on opposite sides of the gap, the walls of each recess constituting a pair of opposed guides shaped to permit movement of the pad assembly towards and away from the opposite side of the caliper, while restraining movement of the pad assembly in a plane parallel to that of the brake disc.

In disc brakes of this form it is usual to remove the caliper from its mounting to permit insertion of new pad assemblies through the gap normally occupied by the brake disc, and the present invention provides an arrangement for facilitating this operation and making it possible to fit pad assemblies whose thickness exceeds the width of the caliper gap in solid calipers, and making it possible to do so without the need to split the caliper in the case of jointed calipers.

In accordance with the present invention, whose precise scope is defined in the appended claims, at least one of the recesses is so shaped that the corresponding pad assembly can be inserted therein by movement in a plane parallel to that of the brake disc, relative movement in that plane between the inserted pad assembly and the caliper head being positively prevented by the engagement of a spring clip carried by one of those members with a locking shoulder on the other of those members, the spring clip yielding resiliently to permit insertion of the pad assembly into the recess and returning into locking engagement with the shoulder upon completion of the inserting movement.

A number of specific embodiments of the invention will now be described, by way of example only, with reference to the accompanying drawings, in which.

Figure 1:
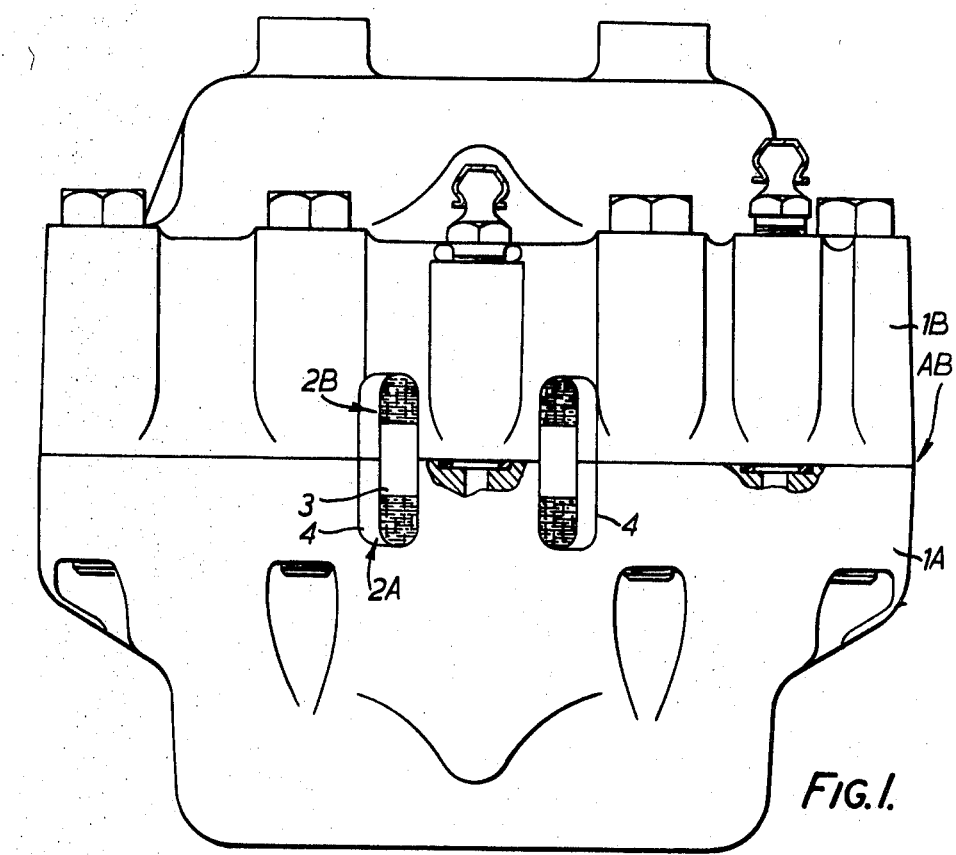
FIG. 1 is a top plan view of a disc brake in accordance with the invention.
Figure 2:
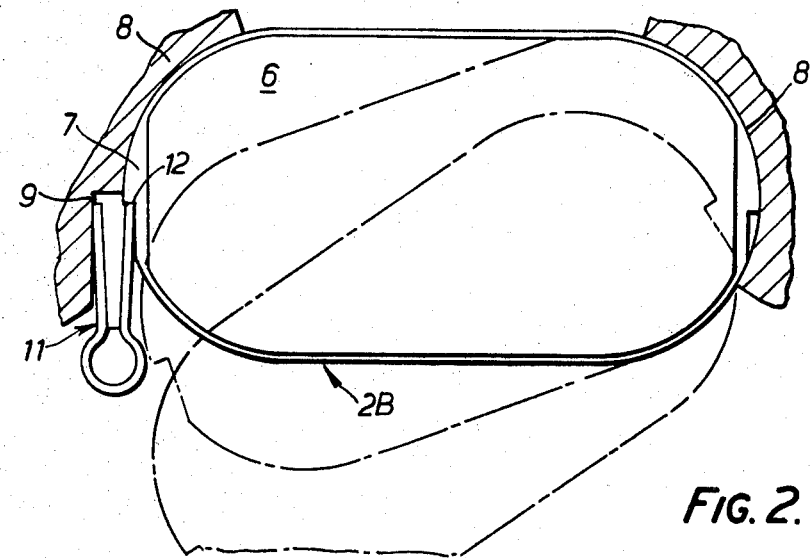
FIG. 2 is a diagrammatic side elevation of one pad assembly, pair of pad guides and spring clip of the brake of FIG. 1.

The brake shown in FIGS. 1 and 2 comprises a jointed caliper structure comprising separate caliper halves 1A and 1B secured together face to face along the joint line AB. Opposed pad assemblies 2A, 2B are mounted in recesses in the caliper structure on either side of a gap 3 occupied in use by the brake disc. The caliper halves each house a pair of actuating pistons for forcing the associated pad assembly against the brake disc, i.e. towards the opposite half of the caliper. Inspection windows 4 are provided in the bridge portion of the caliper.

In this embodiment, the pad assemblies each include a friction pad 6 bonded or otherwise secured to a backplate 7 having arcuate end edges which cooperate with complementarily shaped guides 8, constituted by the walls of the recess in the caliper structure in which the pad assembly is accommodated. As shown in FIG. 2, one of these guides has a cutout 9, housing a V-shaped spring clip 11, one arm of which cooperates with a notch 12 in the adjacent portion of the backplate 7. The pair of guides for the other pad assembly may be precisely similar to those shown in FIG. 2, but they can be made without the cutout 9 and clip 11.

Figure 3:
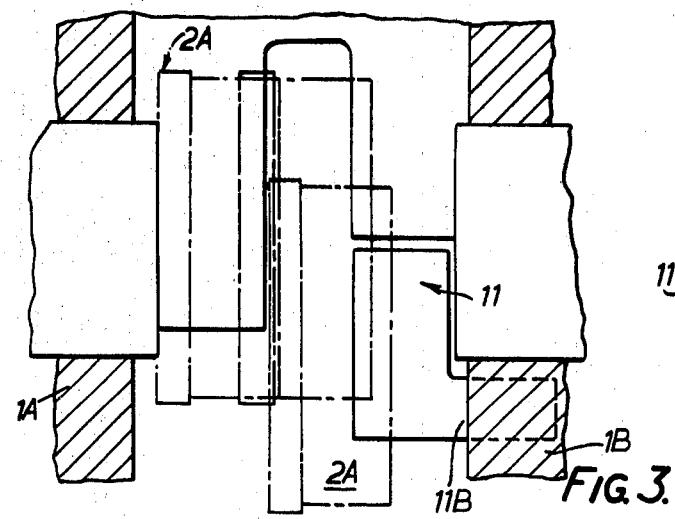
FIGS. 3 and 4 are diagrammatic end elevations showing successive stages of pad insertion.
Figure 4:
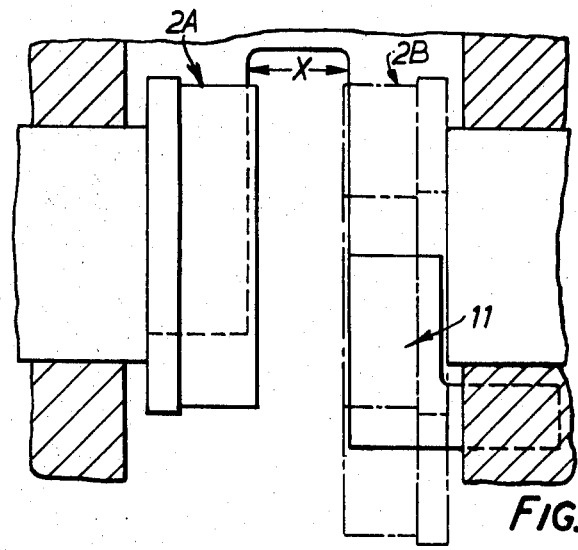

The manner of fitting a new pair of pad assemblies is illustrated in FIGS. 3 and 4. The first pad assembly 2A is first moved upwardly in the caliper gap, its pad 6 passing between the pad guides on one side of the caliper, until its backplate registers with the guides on the other side (left-hand side in FIG. 3). The assembly is then moved to the left up against the crowns of the actuating pistons. The second pad 2B is then inserted by moving it in its own plane, so that it clears the first pad assembly. The end of the assembly remote from the cutout 9 is first engaged with the appropriate guide 8, and the opposite end, (left-hand end in FIG. 2) is then swung upwardly, deflecting the adjacent arm of clip 11, which springs back into the notch 12 when the pad assembly is in correct registry with its guides. Thus, each of the pad assemblies may have a total thickness greater than the width X of the caliper gap by virtue first of the fact that the pad of one assembly can pass upwardly between the guides on the opposite side of the caliper, and secondly that the other pad assembly can be inserted by movement essentially in its own plane. If the guides for each pad are as shown in FIG. 2, each pad in turn can be inserted by movement in its own plane.

Figure 5:
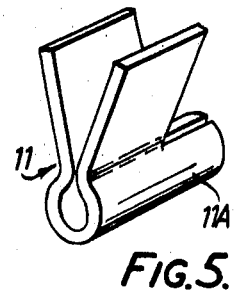
FIGS. 5, 6 and 7 show one form of spring clip, a blank from which it is made and an alternative clip, respectively.
Figure 7:
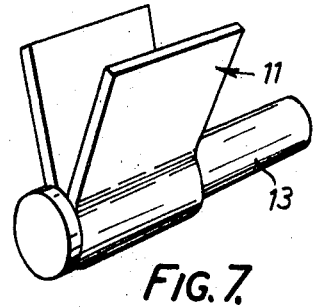
Figure 6:
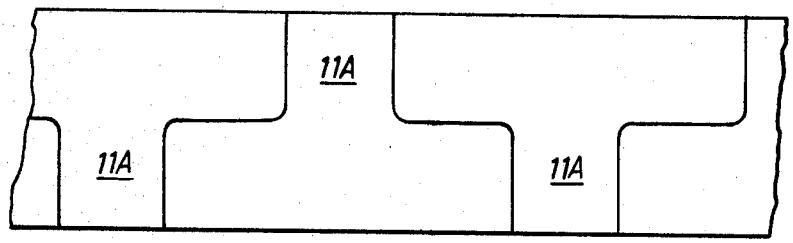

The spring clip 11 may be formed as shown in FIG. 5 from a spring metal blank which is cut from a strip as shown in FIG. 6 and is shaped to provide the diverging spring arms of the V, and also a projecting pin portion 11A enabling the clip to be mounted on one of the caliper halves. Alternatively, as shown in FIG. 7, the clip may have a separate, headed pin 13 for securing it to the caliper.

Figure 8:
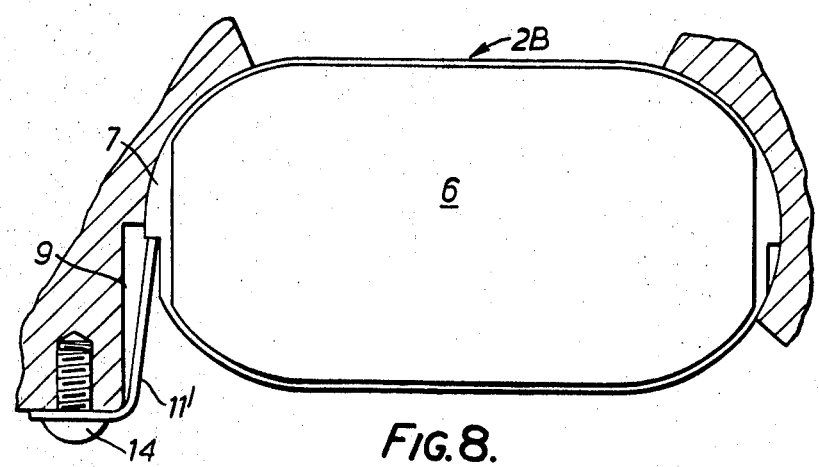
FIGS. 8, 9 and 10 are views corresponding to FIG. 2 of three alternative forms of brakes in accordance with the invention.

FIG. 8 illustrates a further modification in which the spring clip 11' is of L-shape, having one limb fixed to the caliper structure by a setscrew 14 or other suitable fastener.

In each of the above described constructions, the spring clip tends to push the pad endwise towards one pad guide. Preferably, this is the guide which is loaded to take the drag forces transmitted during forward braking, so as to obviate mechanical impact when the brake is applied, as well as eliminating or reducing rattling in the "brakes off" condition.

Figure 9:
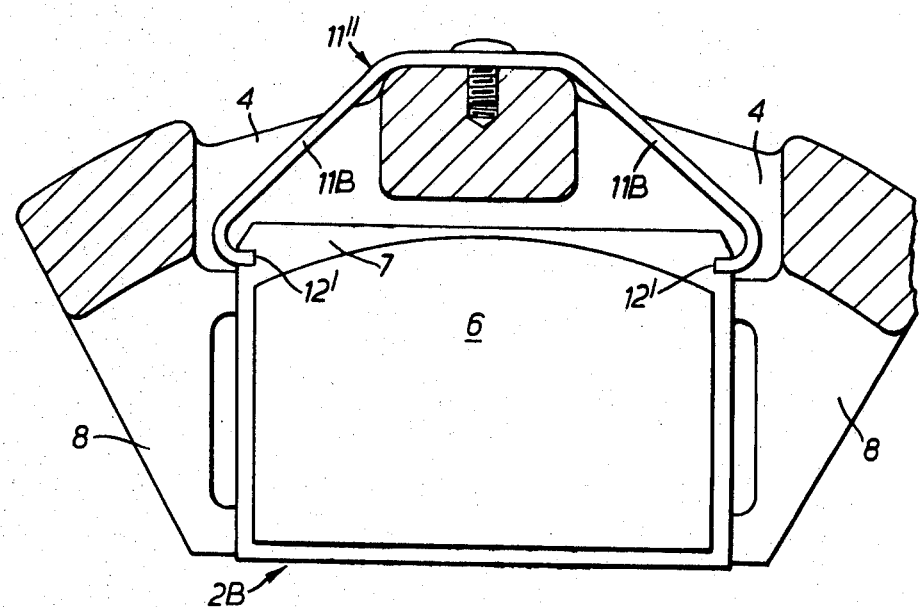

In the construction shown in FIG. 9, the pad guides are parallel sided, and the spring clip 11'' is formed with diverging arms 11B formed at their extremities with hooks for engaging in respective notches 12' in the opposed edges of the backplate 7. The central portion of the clip is secured to the bridge portion of the caliper, with the arms 11B extending downwardly through the inspection windows 4. In this case, of course, the pad assembly 2B is inserted by simple upward movement. The other pad assembly may be mounted in similar manner, or may be simply keyed in the pad guides by means, for example, of cooperating projections and recesses on the backplate and pad guides.

Figure 11:
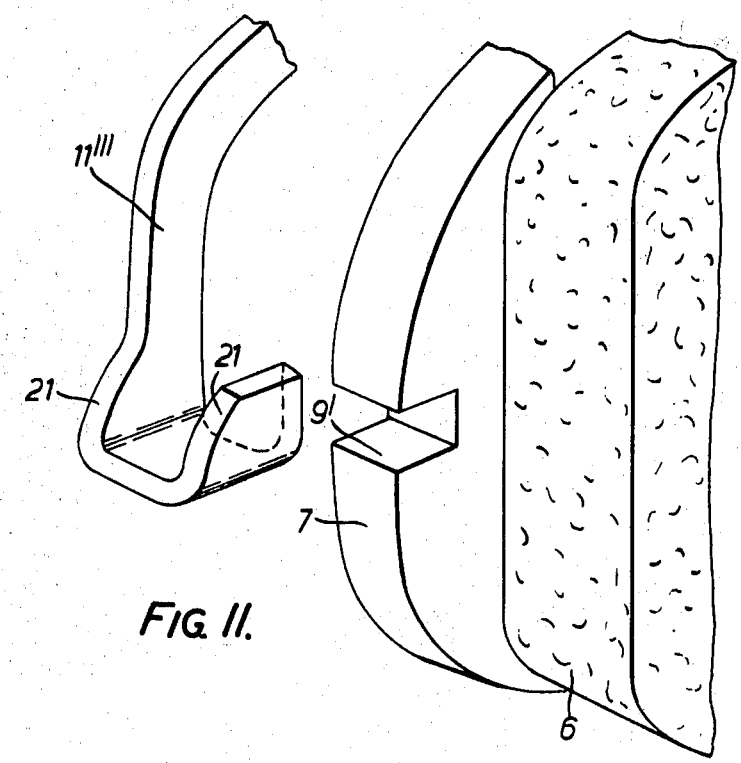
FIG. 11 is a fragmentary perspective view of parts of the construction of FIG. 10, shown separated from one another.
Figure 10:
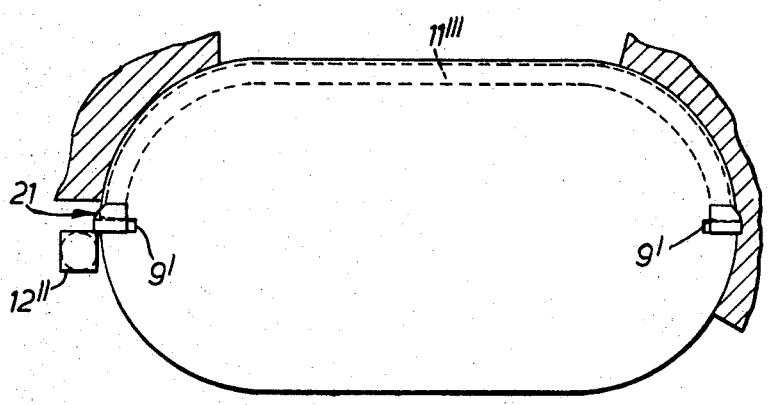

In each of the embodiments of the invention described above the spring clip is mounted on the caliper structure and the shoulder with which the clip makes locking engagement is formed on the pad assembly, but this arrangement can be reversed. FIGS. 10 and 11 show a construction in which the spring clip is mounted on the pad assembly and a shoulder with which the clip makes snap engagement is provided on the caliper structure. The pad assembly shown in these FIGS. is generally similar to that of the constructions previously described, but instead of being formed with a notch 12 to provide a locking shoulder, each arcuate end of the backplate 7 is formed with a slot 9'. These slots receive the hooked end portions of a generally C-shaped spring clip 11''', thereby retaining the spring clip to the pad assembly. With the spring clip unstressed, one end portion of the spring clip projects beyond the end of the backplate but the depth of the slots 9' is sufficient to allow inward flexing movement of the ends of the spring clip. A locking shoulder is provided by a square-ended peg 12'' secured to the caliper structure. On insertion of the pad assembly, the projecting end of the spring clip engages the peg 12'' from below and being beveled, as shown at 21, this end of the clip is forced back into the slot 9', allowing insertion of the pad assembly to be completed. The clip then springs back into the position shown in FIG. 10 and forms a key between the upper face of peg 12'' and the downwardly facing edge of slot 9', positively locking the pad assembly against downward movement.

Many other detail variations in the above described embodiments are, of course, possible within the scope of the invention, as defined in the appended claims.

I claim:

1. In a caliper-type disc brake comprising a caliper structure formed with a gap for the reception of a peripheral part of a brake disc and with a pair of opposed recesses formed in the body on opposite sides of said gap, said recesses having integral end walls, and a pair of renewable brake pad assemblies, one accommodated in each of said recesses, each of said pad assemblies having end parts and each of said recesses having end walls receiving said end parts for guiding the movement of said pad assemblies towards and away from one another, the end part of at least one of said pad assemblies being encompassed by so much of one of said end walls that when said pad assembly is in its position of use said end part is prevented by said end wall from radial movement in a plane parallel to the plane of the disc, the other end wall encompassing only so much of the corresponding end part of said pad assembly that said end part is capable of substantially radial movement in one direction in the plane of the disc but not in the other, a spring clip on either the last mentioned end part of the pad assembly or the corresponding end wall, and a shoulder on the other of said last mentioned members with which said spring clip engages said shoulder when said pad assembly is in position in said recess, said clip being constructed and arranged to resiliently yield to permit insertion of said one end of said pad assembly into its position of use by radial movement of said one end toward the corresponding end wall and returning resiliently into positive locking engagement with said shoulder upon completion of the inserting movement.

2. A brake according to claim 1, wherein said spring clip is mounted on said caliper structure and said shoulder is formed on said pad assembly, said spring clip shaped and mounted to have an arm extending obliquely upwardly into said recess and making snap fitting locking engagement with said shoulder.

3. A brake according to claim 1, wherein said spring clip comprises a pair of oppositely directed spring arms extending downwardly into said recess, each of said arms having at its outer end an inwardly directed hook, said clip being mounted on said caliper structure and said pad assembly being formed with notches receiving said hooks.

4. A brake according to claim 1, wherein said spring clip is mounted on said pad assembly and has hooked end portions, said pad assembly has slots to receive said hooked end portions, one of said end portions normally projecting partially from said slots but resiliently retractable thereinto, and said caliper structure has a shoulder for locking engagement with the projecting part of said end portion.